United States Patent Office 3,812,173
Patented May 21, 1974

---

3,812,173
ORTHO-PHENYLENEDIAMINE DERIVATIVES
Raymond Giraudon, Lesigny, France, assignor to Rhone-Poulenc S.A., Paris, France
No Drawing. Filed Apr. 7, 1971, Ser. No. 132,203
Claims priority, application France, Apr. 9, 1970, 7012837; Oct. 9, 1970, 7036616
Int. Cl. C07c *129/12*
U.S. Cl. 260—471 C    10 Claims

ABSTRACT OF THE DISCLOSURE

Compounds of the formula:

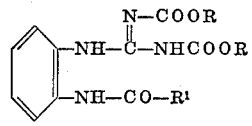

wherein the symbols R represent identical alkyl radicals of 1 through 4 carbon atoms, and the symbol $R^1$ represents hydrogen, alkyl of 1 through 6 carbon atoms, or alkoxy of 1 through 4 carbon atoms, possess fungicidal and anthelmintic properties.

---

This invention relates to new derivatives of *ortho*-phenylenediamine, to a process for their preparation and to compositions containing them.

The *o*-phenylenediamine derivatives of the present invention are those of the general formula:

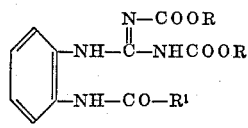

wherein the symbols R represent identical alkyl radicals containing 1 to 4 carbon atoms, and the symbol $R^1$ represents a hydrogen atom or an alkyl radical containing 1 to 6 carbon atoms or an alkoxy radical containing 1 to 4 carbon atoms, the carbon atoms of the alkyl and alkoxy radicals being in a straight or branched chain. Preferred compounds of general formula I are those wherein both symbols R represents methyl or ethyl radicals.

According to a feature of the invention, the *o*-phenylenediamines of general formula I are prepared by reaction of an aniline derivative of the general formula:

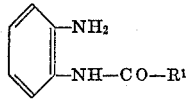

(wherein $R^1$ is as hereinbefore defined) with an isothiourea of the general formula:

wherein the symbols R are as hereinbefore defined. The reaction is generally carried out in an aqueous-organic acid medium preferably at ambient temperature, i.e. about 20° C. The organic acid in the reaction medium is preferably acetic acid.

The isothiourea reactants of general formula III can be prepared by reaction of an alkyl halogenoformate, the alkyl radical of which contains 1 to 4 carbon atoms in a straight- and or branched chain, with 2-methylisothiourea.

The starting materials of general formula II wherein $R^1$ represents an alkoxy radical can be prepared according to the method described by Ch. Rudolf, Ber *12*, 1295 (1879).

The starting materials of general formula II wherein $R^1$ represents a hydrogen atom or an alkyl radical can be obtained by catalytic reduction of a 2-nitroaniline derivative of the general formula:

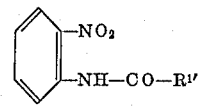

(wherein $R^{1\prime}$ represents a hydrogen atom or an alkyl radical containing 1 to 6 carbon atoms) by methods known *per se* for the reduction of the nitro group to a primary amino group.

The 2-nitroaniline derivatives of general formula IV can be obtained in accordance with methods known *per se* for the N-acylation of 2-nitroaniline.

The *o*-phenylenediamine derivatives of general formula I possess useful fungicidal properties; they have parparticularly interesting contact action against cumcumber mildew (*Erysiphe cichoracearum*), applied mildew (*Podosphaera leucotricha*), bean anthracnose (*Colletotrichum lindemuthianum*) and wheat rust (*Puccinia glumarum*) when applied at quantities of between 10 and 50 g. per hectolitre of liquid diluent. They furthermore have the advantage of being systemic, in particular when they are applied by sprinkling soil with liquid compositions containing them, against beam anthracnose and against cucumber mildew at dose greater than or equal to 0.1 g./hectolitre.

The *o*-phenylenediamine derivatives of general formula I also possess useful anthelmintic properties. *In vitro*, they have shown themselves particularly active against the larvae of digestive threadworms of horses at concentrations between 1 g. and 1 mg. per litre of solution. *In vivo*, they have shown themselves active against *Haemonchus contorsus*, *Trichostrongylus axei* and *Trichostrongylus columbiformis* at doses of 15 mg./kg. animal body weight when administered orally to sheep.

The compounds of general formula I wherein the symbols R repersent methyl or ethyl radicals and $R^1$ repersents a hydrogen atom, an alkyl radical containing 1 to 3 carbon atoms or an alkoxy radical containing 1 or 2 carbon atoms are of particular value. Preferred compounds as fungicides are 1-(2-acetamido-phenyl)-2,3-bis-methoxycarbonyl-guanidine and 1-(2-butyramido-phenyl)-2,3-bis-methoxycarbonyl-guanidine. Preferred compounds as anthelmintics are 1-(2-ethoxycarbonylamino-phenyl) - 2,3 - bis - methoxycarbonyl - guanidine and 1-(2-formamido-phenyl)-2,3-bis-methoxycarbonyl-guanidine.

The following examples illustrate the preparation of *o*-phenylenediamine derivatives of general formula I by the process of the invention.

EXAMPLE 1

2-ethoxycarbonylamino-aniline (4.5 g.) is added, all at once, at 20° C. to a suspension of 1,3-diethoxycarbonyl-2-methyl-isothiourea (5.85 g.) in water (25 cc.) and acetic acid (4.5 g.), and the mixture is stirred at 20° C. until the evolution of gas ceases. The reaction mixture is then diluted by adding water (100 cc.) and the precipitate formed is filtered off. The solid is washed with water (2× 100 cc.) and with petroleum ether (3× 50 cc.) and then dried under reduced pressure (0.5 mm. Hg) at 20° C. 1 - (2 - ethoxycarbonylamino-phenyl) - 2,3 - bis-ethoxycarbonyl-guanidine (9 g.), melting at 105° C., is thus obtained.

1,3 - diethoxycarbonyl - 2 - methyl - isothiourea, melting at 46° C., can be obtained by reaction of ethyl chloroformate with 2-methyl-isothiourea.

2-ethoxycarbonylamino-aniline, melting at 84° C., can be prepared as described by Ch. Rudolf, Ber. *12*, 1295 (1879).

EXAMPLE 2

A mixture of 1,3 - dimethoxycarbonyl - 2 - methyl-isothiourea (5.1 g.) and 2 - ethoxycarbonylamino-aniline (4.5 g.) in water (25 cc.) and acetic acid (4.5 g.) is stirred at a temperature of about 20° C. until the evolution of gas ceases. The reaction mixture is thereafter treated as indicated in Example 1. 1 - (2 - ethoxycarbonylamino-phenyl) - 2,3 - bis-methoxycarbonyl-guanidine (6.2 g.), melting at 150° C., is thus obtained.

1,3 - dimethoxycarbonyl - 2 - methyl - isothiourea, melting at 100° C., can be obtained by reaction of methyl chloroformate with 2-methyl-isothiourea.

EXAMPLE 3

2-amino-formanilide (8.5 g.) is added, all at once, to a stirred suspension of 1,3 - dimethoxycarbonyl - 2 - methyl-isothiourea (12.9 g.) in a mixture of water (62 cc.) and acetic acid (10.8 cc.), and the reaction medium is stirred for three hours at a temperature of about 20° C.; at the end of this period, the reaction mixture has set solid. It is diluted with water (150 cc.) and stirred further until the evolution of gas ceases. The precipitate is filtered off, washed with acetone (2× 150 cc.) and dried. 1 - (2 - formamido - phenyl) - 2,3 - bis-methoxycarbonyl-guanidine (14.9 g.), melting at 216° C., is thus obtained.

EXAMPLE 4

A suspension of 1,3 - dimethoxycarbonyl - 2 - methyl-isothiourea (10.3 g.) in water (50 cc.) and acetic acid (9 cc.) is stirred. 2-amino-acetanilide (7.5 g.) is added all at once, to this suspension and the mixture is stirred at a temperature of about 20° C. The mixture thickens and sets solid in a few minutes. Water (100 cc.) is added and the reaction medium is again stirred until the evolution of gas ceases (a period of about 5 hours); the mixture is then allowed to stand overnight. The precipitate is filtered off and successively washed with water (3× 100 cc.), acetone (2× 50 cc.) and petroleum ether (boiling point 40–60° C.; 2× 100 cc.). After drying, 1-(2-acetamido-phenyl) - 2,3 - bis-methoxycarbonyl-guanidine (13 g.), melting at 175° C., is obtained.

EXAMPLE 5

A suspension of 2-heptanamido-aniline (melting point 94° C.; 11.6 g.) and of 1,3 - dimethoxycarbonyl-2-methyl-isothiourea (10.9 g.) in water (100 cc.) and acetic acid (9 cc.) is stirred for 4 hours at a temperature of about 20° C., and ethanol (50 cc.) is then added to render the medium more fluid; stirring is continued for a further 15 hours. The precipitate, after filtering off and drying, is recrystallized from diisopropyl ether, 1-(2 - heptanamido-phenyl) - 2,3 - bis-methoxycarbonyl-guanidine (11 g.), melting at 101–102° C., is thus obtained.

EXAMPLE 6

1 - (2 - hexanamido-phenyl) - 2,3 - bis - methoxycarbonylguanidine (18.2 g.), melting at 119° C., is prepared from 2-hexanamido-aniline (14.5 g.) and 1,3-dimethoxycarbonyl - 2 - methyl-isothiourea (14.5 g.), following the procedure described in Example 5.

EXAMPLE 7

A mixture of 1,3 - dimethoxycarbonyl - 2 - methyl-isothiourea (10.3 g.) and 2-propionamido-aniline (8.2 g.) in water (50 cc.) and acetic acid (9 g.) is stirred at a temperature of about 20° C. until the evolution of methyl-mercaptan ceases. The reaction medium is diluted with water (50 cc.) and stirred for a further 4 hours, and the precipitate is then filtered off. After washing the solid with water (2× 100 cc.) and then with petroleum ether (3× 100 cc.), the product is dried under reduced pressure.

A crystalline solid (15 g.), melting at 145° C., is thus obtained. After recrystallization from ethanol, 1-(2-propionamido-phenyl) - 2,3 - bis-methoxycarbonyl-guanidine (13.5 g.), melting at 149° C., is obtained.

2-propionamido-aniline, melting at 123° C., used as starting material can be prepared by reaction of propionic anhydride with o-phenylenediamine.

EXAMPLE 8

A mixture of 1,3 - dimethoxycarbonyl - 2 - methyl-isothiourea (10.3 g.) and 2-butyramido-aniline (8.9 g.) in water (50 cc.) and acetic acid (9 g.) is stirred at a temperature of about 20° C. until the evolution of gas ceases. The reaction mixture is thereafter treated as indicated in Example 1. 1,(2-butyramido-phenyl) - 2,3 - bis-methoxycarbonyl-guanidine (13.2 g.), melting at 139° C., is thus obtained.

2-butyramido-aniline, melting at 134° C., which is used as starting material can be prepared by reaction of butyric anhydride with o-phenylenediamine.

Following the same procedure and using 1,3 - dimethoxycarbonyl - 2 - methyl-isothiourea and appropriate starting materials of general formula II, the following products of general formula I are prepared:

1-(2-methoxycarbonylamino-phenyl)-2,3-bis-methoxycarbonyl-guanidine, melting at 142° C.;
1-(2-isovalerylamido-phenyl)-2,3-bis-methoxycarbonyl-guanidine, melting at 143° C., and
1-(2-valerylamido-phenyl)-2,3-bis-methoxycarbonyl-guanidine, melting at 132° C.

In the foregoing Examples the melting points indicated are those determined on the Kofler bench.

According to a further feature of the present invention, there are provided fungicidal compositions which contain, as the active ingredient, at least one o-phenylenediamine derivative of general formula I in association with one or more diluents or adjuvants compatible with the o-phenylenediamine derivative(s) and suitable for use in agricultural fungicidal compositions. These compositions can optionally contain other compatible pesticides, such as insecticides or anti-mildew agents (e.g. Maneb.). Preferably the compositions contain between 0.005% and 80% by weight of o-phenylenediamine derivative.

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the o-phenylenediamine derivative with the solid diluent, or by impregnating the solid diluent with a solution of the o-phenylenediamine derivative in a volatile solvent, evaporating the solvent, and if necessary grinding the product so as to obtain a powder.

Instead of a solid diluent, there may be used a liquid in which the o-phenylenediamine derivative is dissolved or dispersed. The compositions may thus take the form of suspensions, emulsions or solutions in organic or aqueous-organic media, for example aromatic hydrocarbons such as toluene or xylene, mineral, animal or vegetable oils, or acetophenone, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are required, the o-phenylenediamine derivatives may be used in the form of self-emusifying concentrates containing the active substance dissolved in the emulsifying agent or in a solvent containing an emulsifying agent compatible with the o-phenyl enediamine derivative and solvent, a simple addition of water to such concentrates producing compositions ready for use.

The o-phenylenediamine derivatives of general formula I may be used as fungicides in quantities of 0.1 to 50 g. per hectolitre of, for example, water.

The following Example illustrates fungicidal compositions of the present invention.

EXAMPLE 9

A condensation product (10 parts) of octylphenol and ethylene oxide in the ratio of 10 moles of ethylene oxide per mole of octylphenol is added to a solution of 1-(2-acetamido-phenyl)-2,3-bis - methoxycarbonyl - guanidine (25 parts) in a mixture (65 parts) of equal parts of toluene and of acetophenone, the said parts being parts by weight.

The solution obtained is used after dilution with water in hte ratio of 100 cc. of solution per 100 liters of water to protect plants against attacks by fungi.

The present invention also includes pharmaceutical and veterinary compositions which comprise, as the active ingredient, at least one o-phenylenediamine derivative of general formula I in association with a carrier or coating generally used in the preparation of pharmaceutical and veterinary compositions. The compositions are preferably in a form suitable for oral administration.

Tablets, pills, powders or granules can be used as solid compositions for oral administration. In these compositions the o-phenylenediamine derivative is mixed with one or more inert diluents, such as sucrose, lactose or starch. These compositions can also contain substances other than diluents, for example lubricants such as magnesium stearate.

Pharmaceutically acceptable emulsions, solutions, suspensions, syrups and elixirs, containing inert diluents such as water or paraffin oil, can be used as liquid compositions for oral administration. These compositions can also contain substances other than the diluents, such as, for example, wetting agents or sweetening or flavoring agents.

In veterinary therapy, the o-phenylenediamine derivatives can be used for the treatment of nematodal helminthiases of cattle, sheep, goats and domestic animals in general, at single dosages of between 25 anl 100 mg./kg. animal body weight, administered orally.

In human therapy, the o-phenylenediamine derivatives acn be used at single dosages of between 10 and 50 mg./kg. administered orally. These dosages can be repeated at regular intervals of several days or several weeks to achieve definitive removal of the parasite.

In general, the physician or veterinary surgeon will decide the posology which is considered most appropriate, depending on the species in question as well as the age, the weight, the degree of infection and all other factors peculiar to the subject to be treated.

The following Example illustrates therapeutic compositions according to the invention.

EXAMPLE 10

Tablets, weighing 0.7 g., having the following composition are prepared in accordance with the usual technique:

|  | G. |
|---|---|
| 1-(2-ethoxycarbonylamino-phenyl)-2,3-bis - methoxycarbonyl-guanidine | 0.500 |
| Wheat starch | 0.150 |
| Colloidal silica | 0.040 |
| Magnesium stearate | 0.010 |

I claim:

1. Ortho-phenylenediamine derivatives of the formula:

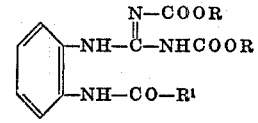

wherein the symbols R represent identical alkyl radicals of 1 through 4 carbon atoms and the symbol $R^1$ represents hydrogen, alkyl of 1 through 6 carbon atoms or alkoxy of 1 through 4 carbon atoms.

2. Ortho-phenylenediamine derivatives according to claim 1 wherein both R symbols represent methyl or ethyl.

3. Ortho-phenylenediamine derivatives according to claim 1 wherein the symbols R represent methyl or ethyl radicals and $R^1$ represents hydrogen, alkyl of 1 though 3 carbon atoms or alkoxy of 1 or 2 carbon atoms.

4. 1-(2-acetamido-phenyl)-2,3 - bis - methoxycarbonyl-guanidine.

5. 1-(2-butyramido-phenyl)-2,3-bis - methoxycarbonyl-guanidine.

6. 1-(2-ethoxycarbonylamino-phenyl)-2,3-bis-methoxycarbonyl-guanidine.

7. 1-(2-formamido-phenyl)-2,3-bis - methoxycarbonyl-guanidine.

8. 1-(2-ethoxycarbonylamino-phenyl)-2,3-bis - ethoxycarbonyl-guanidine.

9. 1-(2-propionamido-phenyl)-2,3-bis-methoxycarbonyl-guanidine.

10. 1-(2-methoxycarbonylamino-phenyl)-2,3-bis-methoxycarbonyl-guanidine.

References Cited

UNITED STATES PATENTS 3,629,334  12/1971  Benko et al. _____ 260—471 A

LORRAINE A. WEINBERGER, Primary Examiner

L. H. THAXTON, Assistant Examiner

U.S. Cl. X.R.

424—300